United States Patent [19]

Milligan

[11] Patent Number: 5,435,253
[45] Date of Patent: Jul. 25, 1995

[54] VACUUM HIGHWAY SEAL

[76] Inventor: George T. Milligan, 929 E. Bailey Rd., Naperville, Ill. 60565

[21] Appl. No.: 249,959

[22] Filed: May 27, 1994

[51] Int. Cl.6 .......................................... B61B 13/10
[52] U.S. Cl. ................................. 104/138.1; 104/71
[58] Field of Search .................... 104/138.1, 138.2, 71, 104/73, 23.1

[56] References Cited

U.S. PATENT DOCUMENTS

| | | | |
|---|---|---|---|
| 929,972 | 8/1909 | M'Giehan | 104/71 |
| 3,108,546 | 10/1963 | Hafner | 104/138.1 |
| 3,848,536 | 11/1974 | Chukhanov et al. | 104/138.1 |
| 4,102,272 | 7/1978 | Lehl et al. | 104/138.1 X |
| 4,148,260 | 4/1979 | Minovitch | 104/138.1 |
| 4,567,817 | 2/1986 | Fleischer et al. | 104/138.1 X |

FOREIGN PATENT DOCUMENTS

| | | | |
|---|---|---|---|
| 1338121 | 11/1973 | United Kingdom | 104/138.1 |
| 2114195 | 8/1983 | United Kingdom | 104/138.1 |

*Primary Examiner*—Robert J. Oberleitner
*Assistant Examiner*—Kevin D. Rutherford

[57] ABSTRACT

A vacuum highway seal provides an effective barrier for maintaining a separation between the atmosphere and a vacuum highway, which allows vehicles to reach near orbital speeds on the surface of the earth. The vacuum highway seal is composed of a pool of water with a pipe extending from several feet below the surface to approximately forty feet above the surface of the water. Water is pushed by atmospheric pressure from the pool to approximately thirty two feet above the pool into the pipe. A vehicle is loaded with cargo and/or people at the dock in the pool, then is submerged and travels to the entrance of the pipe underneath the water. The pipe is tapered and sloped to allow an easy transition from the pool into the vacuum highway. As the water ballast used to submerge the vehicle is expelled the vehicle is accelerated to the surface of the water and the vacuum highway beyond. Once in the vacuum highway a second propulsion system is used to propel and lift the vehicle. Very high velocities can be reached without the forces of drag and friction, which are not present on a levitating vehicle in a vacuum. To maintain the vacuum of the vacuum highway the seal has a large volume maintained by vacuum pumps. To reduce leakage, a closed loop system pumps deaerated water into the pipe near the upper surface of the water thus sweeping away the air entrapped on the surface of the vehicle as it travels through the water. Once the vehicle reaches the destination end of the vacuum highway, it descends through a second vacuum highway seal and proceeds to the dock to allow passengers to exit or cargo to be unloaded. The vacuum highway has application with propulsion technologies which will not pressurize the vacuum highway with gases.

11 Claims, 3 Drawing Sheets

CROSS SECTION OF THE VACUUM HIGHWAY SEAL

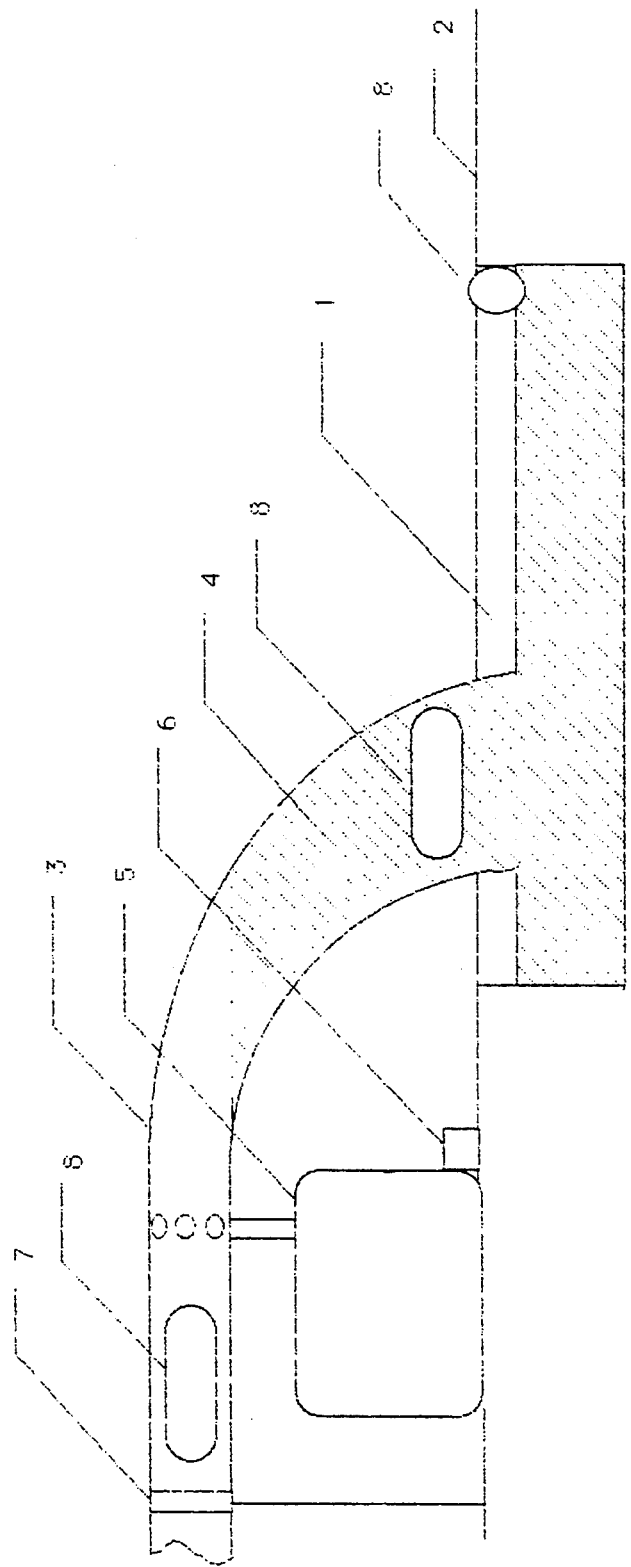
FIGURE 1  CROSS SECTION OF THE VACUUM HIGHWAY SEAL

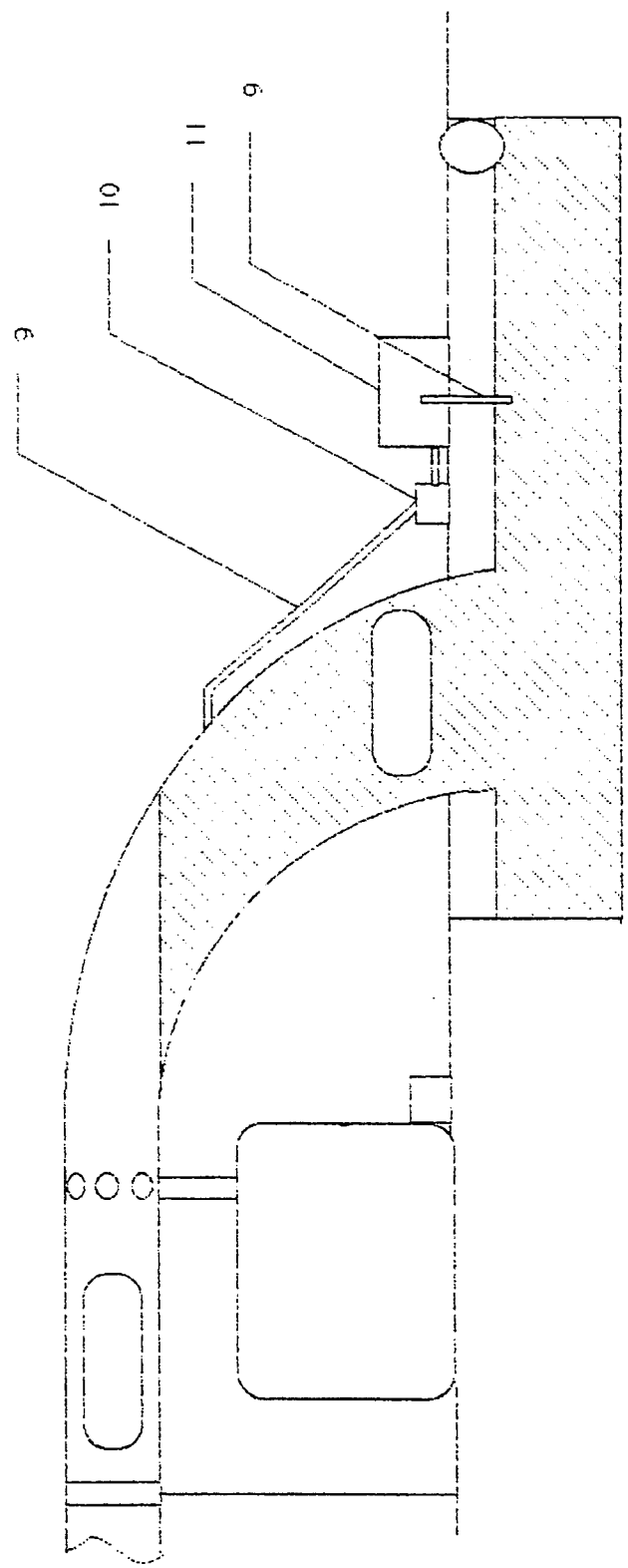
FIGURE 2   VACUUM SEAL KEEP FILL SYSTEM

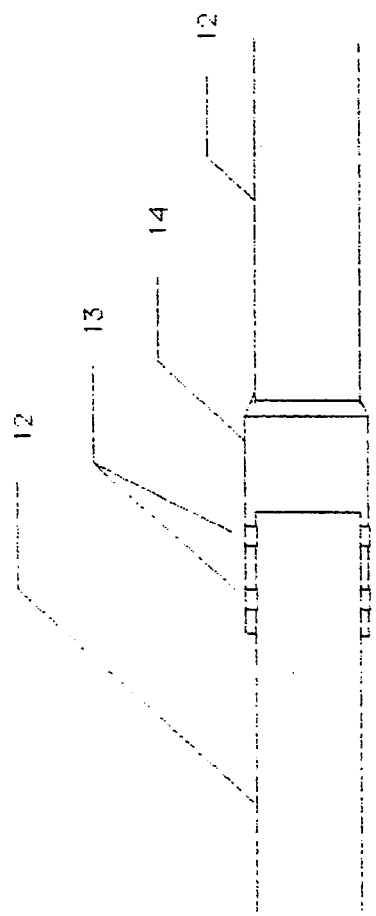

VACUUM HIGHWAY SEAL

TECHNICAL FIELD

The present invention relates to space travel and the invention provides a means for a vehicle to make the transition from atmosphere into a vacuum highway without being launched into outer space. The present invention will allow high speed travel similar to space travel without the cost and complexity associated with space craft launches. Technology and materials are readily available for development of this invention and associated industry

BACKGROUND OF THE INVENTION

Space technology has been applied to solve many of man's problems; however one of the most basic space technologies (the high velocity of space craft in the vacuum of space) has not been applied generally. The orbital velocities in the vacuum of space, which space craft maintain without substantial energy, can be applied to earth transportation. While space craft travel nearly 20,000 miles per hour, transportation systems on earth are typically designed for travel from nearly 50 to 500 miles per hour. To travel at speeds close to those of space craft near the Earth's surface, near space conditions have to be created for the vehicles. The near vacuum of space can be created by using long tubular segments between ports or stations and seals which will allow the vehicle to travel from the normal atmosphere into a vacuum highway and return to the normal atmosphere at the journey's end without significant restrictions. The technology exists for vehicles which travel at high speeds in the vacuum of space. That technology only needs to be adapted for travel in a vacuum highway.

Creation of a transportation system with near orbital speeds has the potential to improve commerce and communication among peoples of the earth. The vacuum highway also provides a containment for pollution released from internal propulsion sources. Exhaust gases and liquids can be treated prior to release to the environment.

BRIEF DISCLOSURE OF THE INVENTION

The preferred embodiment of the present invention is a large pool of water with a dock area for loading and unloading vehicles. The pool has an entrance to a vacuum highway through a vacuum seal. The vehicles float while tied to the dock. The entrance for vehicles into the pool from a vacuum highway, a horizontal cylindrical pipe segment, is through a vacuum seal. The vacuum seal is made by extending the pipe into an enlarging truncated conical section, which curves down into the pool. The vehicle travels in a vacuum inside the horizontal pipe. Upon reaching the end of the horizontal pipe the vehicle slows to settle in the water, which is approximately thirty two feet above the pool. Once on the water, pumps internal to the vehicle or the vehicles' speed (kinetic energy) fills the ballast tanks of the vehicle with water. When the weight of the vehicle with ballast is great enough, the vehicle sinks through the water to the bottom of the conical section. Once the vehicle is below the conical section, the pumps remove the water ballast. While removing the ballast the pumps propel the vehicle to the side of the dock. Once beside the dock and floating the vehicle is unloaded, then reloaded. Water ballast is taken on to submerge the vehicle. While taking on the ballast the vehicle is propelled to the exit vacuum highway seal. The exit seal can be the same as the entrance seal or a second seal for a second vacuum highway. When the vehicle reaches the bottom of the exit seal, the ballast is pumped from the tanks giving the vehicle lift through the water seal and acceleration into the vacuum highway. Once in the vacuum highway the vehicle accelerates to suborbital speeds and travels rapidly to the next destination.

The vacuum highway segments and the seals are made from plastic or metal pipes. A vacuum can be established by purging the air from the pipes with steam which will condense on the inner surface of the pipes when allowed to cool to ambient temperature. The water will collect at the bottom of the pipe and drain to the seals, which form as the steam condenses and the pressure inside the pipe decreases. Once the vacuum is established the pipe will float in the air and must be restrained by anchors located periodically along the pipe. There is a tendency of the pipe to bow between anchors. If necessary a stiffer such as an I-beam is added to minimize irregularities in the vacuum highway. The highway can also be buried or anchored along the surface.

To allow the highway to be drained at other points, loop seals can be installed along the highway as needed. These loop seals can also be made from plastic or metal pipe.

The pool is fabricated from common materials used for making pools including concrete, ceramics, steel, and plastics. Existing lakes or ponds can also be used. The pool must be large enough to contain from one to several vehicles docked in the pool, the entrance to the vacuum highway and the exit from the vacuum highway.

Methods used for tying boats to docks, e.g. cleats and mooring lines, are used. Bumpers protect the sides of the vehicles and pool by preventing the vehicles from rubbing directly against the side of the pool. Gangways are used for loading and unloading people. Cargo is loaded and unloaded through a hatch with a crane. The pool has the capacity to hold the columns of water in the seals when the vacuum in the highway is lost. An adjacent empty pool with a spillway allows all overflow to enter the empty pool.

Directly at the entrance to the vacuum highway from the seal a large volume is connected to the highway. This volume is maintained at a vacuum by the seal and vacuum pumps. The pumps purge air which enters the vacuum highway on the surface of the vehicles or through small leaks in the vacuum highway. Vacuum pumps and associated controls are distributed along the highway as needed to maintain the vacuum.

BRIEF DESCRIPTION OF THE DRAWING

FIG. 1 is a cross section of the vacuum highway seal showing the vehicles in the three portions of the seal. One vehicle is in the vacuum highway, a second is in the water seal in transit from the vacuum highway to the pool, and the third is docked by the side of the pool. The cross hatched area shows the water in the seal. The vacuum tank is connected to the vacuum highway by a header, which allows a vacuum pump to expel gases from the vacuum highway. Gases can leak through the seal or from the vehicles into the vacuum highway. Anchors spaced along the highway will maintain the position of the highway.

FIG. 2 is a cross section of the vacuum highway seal showing the keep fill system.

FIG. 3 is an expansion joint for the vacuum highway. O-rings seal the expansion joints, while allowing the pipes to slip when contracting or expanding.

DETAILED DESCRIPTION

Referring to FIG. 1 the vacuum highway seal is comprised of the following:

Pool of liquid 1
Dock 2
Vacuum highway 3
Transition piece 4 between the pool and the vacuum highway
Vacuum tank 5 with attached vacuum pump 6 to remove air leakage into the vacuum highway 3
Anchors 7 to keep the vacuum highway 3 in position
The liquid keep fill system (see FIG. 2)
Expansion joints (see FIG. 3)
Vehicles 8

The pool of liquid 1 is sufficiently large to accommodate the vehicles 8, dock 2 and the transition piece 4. If several vacuum highways 3 terminate in the same pool of liquid 1, then the pool of liquid 1 is large enough for all transition pieces 4 and several docks 2. The pool of liquid 1 is deep enough to allow vehicles 8 to submerge and travel underwater into the transition piece 4. Liquids for the pool of liquid 1 are typically water or a mixture of water and glycol.

The dock 2 is used for securing the vehicles 8 for loading, unloading and storage. The dock 2 is similar to a boat dock. The floating vehicle 8 is tied to the dock 2 with lines for loading and unloading. Gangways are used for loading and unloading people and light cargo. Cranes on the dock 2 are used for unloading heavier, bulky cargo.

The vacuum highway 3 is made of pipe 12 which extends from the seat at the departure location to the seal at the destination location. The vacuum highway 3 is large enough to accommodate the vehicles 8 traveling at high speed. The vehicles 8 must have both horizontal and vertical clearances sufficiently large to allow vehicle control and propulsion systems to compensate for forces such as gravity. The pipe 12 can be made of material such as plastic or steel. The pipe 12 can be elevated (which may minimize construction cost and environmental impact), located on the ground, or buried.

The transition piece 4 provides elevation for the liquid to equalize atmospheric air pressure. This is the feature which allows the vacuum seal to be maintained. The liquid in the seal is an effective barrier to air by being a physical barrier using elevation and a barrier to prevent leakage due to absorption. Absorption is further prevented by adding deaerated water to the top of the water column. The deaerated water will circulate to the bottom of the transition piece 4 into the pool of liquid 1 and maintain a barrier to absorption in this manner. The transition piece 4 must be large enough to allow the vehicle 8 to pass from the vacuum highway 3 to the pool of liquid 1. Air bubbles on the surface of the vehicle 8 are swept away in the transition piece 4 as the vehicle 8 returns to the vacuum highway 3 from the pool of liquid 1. The transition piece 4 can have many shapes; however, a tilted truncated cone is used in FIG. 1.

The vacuum tank 5 provides a large volume to remove air leakage at the seal. Vacuum pumps 6 maintain the vacuum in the vacuum tank 5 and expel leakage. Redundant vacuum pump 6 design allows vacuum pump 6 maintenance or repair without a vacuum highway 3 outage. Connection of the vacuum tank 5 to the vacuum highway 3 is with a header design to more effectively collect air inleakage.

Anchors 7 keep the vacuum highway 3 in position. The pipe 12 is large enough to accommodate vehicles 8. The air pressure on the volume lifts the vacuum highway 3. The anchors 7 are located at an angle on either side to prevent horizontal movement from wind. The vacuum highway 3 design allows water, which may collect to drain into the seal.

The liquid keep fill (see FIG. 2) consists of pipes 9, pumps 10, valves and a deaerator volume 11. Liquid is taken from the pool of liquid 1 and pumped into a deaerator volume 11 through a sparger. Absorbed air is removed from the liquid. The deaerated liquid is then pumped into the transition piece 4 near the top.

Expansion joints (see FIG. 3) are located along the pipe 12 to allow expansion in warm weather and contraction during cold weather. O-rings 13 in an expanded pipe section 14 form a seal while allowing expansion and contraction of the pipe 12 of the vacuum highway 3.

Vehicles 8 for the vacuum highway 3 are beyond the scope of this patent; however they are likely to be made of very light but durable materials. They will withstand both a vacuum in the vacuum highway 3 and the pressure of water as they travel submerged through the transition piece 4. Double hulled walls are necessary to provide the redundancy of vessel integrity as rupture of a single wall hull would be catastrophic. Propulsion is possible from sources which do not create significant air or gas exhaust. Steam and water vapor are acceptable exhausts, since they condense on the wall of the vacuum highway 3. A means of levitation keeps the vehicle 8 from falling into the wall of the vacuum highway 3.

I claim:

1. A vacuum highway system comprising:
   at least one pool of liquid;
   at least one vehicle adapted to travel in said pool;
   at least one transition piece containing liquid for sealing a vacuum highway and for allowing said at least one vehicle to travel between said at least one pool and said at least one vacuum highway; and
   a vacuum device adapted to remove air from said highway.

2. The vacuum highway system of claim 1, wherein said vacuum highway comprises a pipe means for allowing said at least one vehicle to travel therein at high rates of speed.

3. The vacuum highway system of claim 1, wherein said vacuum device comprises a vacuum tank and a vacuum pump.

4. The vacuum highway system of claim 1, further comprising a containment device for exhaust gases and liquids which allows processing for pollution prior to release.

5. The vacuum highway system of claim 1, wherein said at least one vehicle floats on said pool and submerges to travel to said at least one transition piece.

6. The vacuum highway system of claim 1, wherein said at least one vehicle has levitating means and propulsion means.

7. The vacuum highway system of claim 1, further comprising a dock means to allow said at least one vehicle to tie onto said dock means for loading and unloading.

8. The vacuum highway system of claim 1, wherein said at least one transition piece provides elevation for the liquid in order to equalize atmospheric pressure.

9. The vacuum highway system of claim 1, wherein said at least one transition piece has a truncated cone shape.

10. The vacuum highway system of claim 1, further comprising a deaerator device for removing absorbed air from said liquid.

11. A vacuum highway system comprising:
 (a) a liquid filled segment of pipe for sealing a vacuum highway and for allowing transition of vehicles from atmosphere to said vacuum highway;
 (b) a pool for providing liquid for said pipe segment;
 (c) a dock in said pool for transferring people and cargo; and
 (d) a vacuum volume having vacuum pumps to maintain said vacuum in said vacuum highway.

* * * * *